United States Patent
Matsumoto et al.

(10) Patent No.: US 7,064,767 B2
(45) Date of Patent: Jun. 20, 2006

(54) IMAGE SOLUTION PROCESSING METHOD, PROCESSING APPARATUS, AND PROGRAM

(75) Inventors: Kazuyuki Matsumoto, Shizuoka (JP); Satoshi Kasai, Shizuoka (JP); Teruo Kumakiri, Shizuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/715,822

(22) Filed: Nov. 19, 2003

(65) Prior Publication Data

US 2004/0155886 A1 Aug. 12, 2004

(30) Foreign Application Priority Data

Nov. 19, 2002 (JP) .............................. 2002-334621

(51) Int. Cl.
*G09G 5/00* (2006.01)

(52) U.S. Cl. ...................... 345/582; 345/420; 345/588; 345/635; 382/215; 382/287; 382/294

(58) Field of Classification Search ................ 345/586, 345/588, 630, 632, 635, 638, 419, 420, 581, 345/582, 619; 382/118, 215, 285, 287, 294; 715/964
See application file for complete search history.

(56) References Cited

U.S. PATENT DOCUMENTS

| | | | |
|---|---|---|---|
| 5,742,291 A * | 4/1998 | Palm .......................... 345/420 |
| 6,434,278 B1 * | 8/2002 | Hashimoto .................. 382/285 |
| 6,831,659 B1 * | 12/2004 | Miyashita et al. .......... 345/619 |
| 6,850,243 B1 * | 2/2005 | Kilgariff et al. ............ 345/582 |
| 2001/0005425 A1 * | 6/2001 | Watanabe et al. ........... 382/154 |

FOREIGN PATENT DOCUMENTS

JP 2000-222606 8/2000

* cited by examiner

*Primary Examiner*—Matthew C. Bella
*Assistant Examiner*—Antonio Caschera
(74) *Attorney, Agent, or Firm*—Staas & Halsey LLP

(57) ABSTRACT

The invention establishes a target face to which a texture will be mapped and determines the start point for drawing the texture and the number of drawing iterations. In accordance with the drawing start point and the number of drawing iterations, the texture is mapped to the target face and, further, a wireframe dividing the mapped texture is drawn. When movement of the wireframe is requested, the drawing start point is changed in accordance with the amount of movement of a drag operation. When the number of lines of the wireframe is requested, the number of drawing iterations is changed in accordance with the amount of movement of a drag operation.

4 Claims, 17 Drawing Sheets

LENS EQUATION $$\frac{1}{Z} + \frac{1}{z} = \frac{1}{F} \quad \longrightarrow \quad z = \frac{F * Z}{Z - F}$$

⇓

$$\frac{x'}{X} = \frac{z}{Z} = \frac{F}{Z-F} \doteqdot \frac{F}{Z}$$

⇓

$$X = \frac{Z}{F} * x' \quad Y = \frac{Z}{F} * y'$$

⇓

The number of pixels/Film width=x/x'    The number of pixels/Film width=y/y'

⇓

$$X = \frac{Z}{f} * x \quad Y = \frac{Z}{f} * y$$

IMAGE SOLUTION PROCESSING METHOD, PROCESSING APPARATUS, AND PROGRAM

BACKGROUND OF THE INVENTION

1. Field of the Invention

This invention relates to an image simulation technique for performing processing of mapping a texture to specified faces of a three-dimensional image shown on a display. More particularly, the invention relates to an image simulation technique that allows one to change mapping form of a texture easily and flexibly.

2. Description of the Related Art

Image simulation techniques are known for checking how a three-dimensional image will look by mapping a separate texture to specified faces of the image shown on a display. The inventor has applied an invention according to such image simulation techniques (refer to Patent Document 1, for example).

[Patent Document 1: Japanese Patent Laid-Open No. 2000-222606]

If the art in Patent Document 1 is used, for example, in changing exterior walls of a building for remodeling, an image of the building is captured and the image of its exterior walls is replaced with an image of a wall material that will be used so that an image showing how the building looks after remodeling is generated. Technically, position information for the building is expressed as virtual three-dimensional coordinates, and an exterior wall is recognized as a plane in the coordinates. Then, with consideration of the orientation and size of the recognized plane, repetition of a wall material image is displayed over the exterior wall so that image simulation is carried out. In the process, wall patterns (referred to as "joint") may not match at a position where neighboring exterior walls meet because of difference of the drawing start points for the wall material mapped to one exterior wall and another exterior wall that are contiguous to each other or because of calculation error of the number of times with which a wall material is mapped to two exterior walls.

Conventional arts for adjusting such mismatch of a pattern of a texture mapped to planes of a three-dimensional (3D) image include one as follows: a screen is displayed for a user to enter or modify the drawing start points and the number of drawing iterations for a texture, thereby making an adjustment to eliminate such mismatch of patterns. In such a conventional art, when the user wants to check how a 3D image will look by mapping a separate texture to specified faces of the 3D image shown on a display, the user will repeat an operation of inputting the drawing start positions of the texture and the number of drawing iterations using a screen for entering the information and seeing how mismatch of the wall pattern is displayed correspondingly.

The art poses a problem that a significant amount of time and effort is required from a user to adjust mismatch of a texture pattern because the user cannot know what range of values he/she should input intuitively and thus performs this operation by trial and error. In addition, the operation requires an additional time and effort from a user who does not have technical knowledge about spatial coordinates that is necessary for understanding the relation between the drawing start position of a texture or increase/decrease of the number of drawing iterations and a corresponding presentation of the texture.

SUMMARY OF THE INVENTION

The present invention has been made in view of such circumstances, having an object of providing a novel image simulation method, an apparatus or a program that allows one to change the mapping form of a texture easily and flexibly when the texture is mapped to a specified face of a 3D image shown on a display.

To attain this object, for performing processing of mapping a texture to a specified face of a 3D image shown on a display, the image simulation program according to the invention causes a computer to execute processings of 1) establishing three axes that will be orthogonal to one another in a 3D space on the 3D image; 2) establishing a target face to which a texture will be mapped using a face defined by the three axes; 3) determining the initial values of the drawing start point and the number of drawing iterations for the texture to be mapped to the target face; 4) drawing the target face with a texture mapped thereto on the display in accordance with the drawing start point of drawing the texture and the number of drawing iterations; 5) drawing a wireframe that divides the texture mapped to the target face in accordance with the drawing start point and the number of drawing iterations; 6) in case movement of the wireframe is requested by dragging the wireframe, moving the wireframe by changing the drawing start point in accordance with the amount of movement of the dragging; and 7) in case change of the number of lines of the wireframe is requested by dragging the wireframe, changing the number of lines of the wireframe by changing the number of drawing iterations in accordance with the amount of movement of the dragging.

In the image simulation method that is implemented by the operation of the image simulation program of the invention thus configured, based on interaction with a user and on a 3D image to be processed, three axes that will be orthogonal to each other in a 3D space are established, and by setting the length of one of those axes, the lengths of those axes are established. By establishing the three axes, six faces for which 3D coordinate values can be determined are established, thus, subsequently a face to which a texture will be mapped is established using the six faces. Then, among the sides of the face, a side that is most parallel with any one side of the six faces defined by the three axes is identified, and based on the side, the initial value of the drawing start point for a texture is determined and the initial value of the number of drawing iterations for the texture is determined from the length of the side previously set and the size of the texture. After determining the initial value of the drawing start point and that of the number of drawing iterations for the texture, the target face is drawn on the display with the texture mapped thereto in accordance with the drawing start point and the number of drawing iterations. And if drawing of a wireframe dividing the texture is requested while drawing the face, a wireframe that divides the texture mapped to the target face is drawn on the display in accordance with the drawing start point and the number of drawing iterations.

If movement of the wireframe is requested by dragging the wireframe while drawing the wireframe, the wireframe is moved by changing the drawing start point in accordance with the amount of movement of the dragging. In response to the change of the drawing start point, during movement of the wireframe or at the point movement of the wireframe is complete, the drawing form of the texture to be mapped to the target face is changed according to the changed drawing start point. Meanwhile, if the number of lines of the wireframe is requested by dragging the wireframe while drawing the wireframe, the number of lines of the wireframe is changed by changing the number of drawing iterations in accordance with the amount of movement of the dragging. And in response to the change of the number of drawing iterations, during movement of the wireframe or at the point it is complete, the drawing form of the texture to be mapped to the target face is changed according to the changed number of drawing repetitions.

Thus, the invention adopts such a constitution that draws a wireframe dividing a texture when the texture is mapped to a specified face of a 3D image shown on a display, and changes the drawing form of the texture according to the amount of movement of the dragging if the wireframe is dragged by means of a pointing device such as a mouse. The invention thereby allows one to change the mapping form of a texture in an easy and flexible manner.

DETAILED DESCRIPTION OF THE PREFERRED EMBODIMENTS

Figure 1:
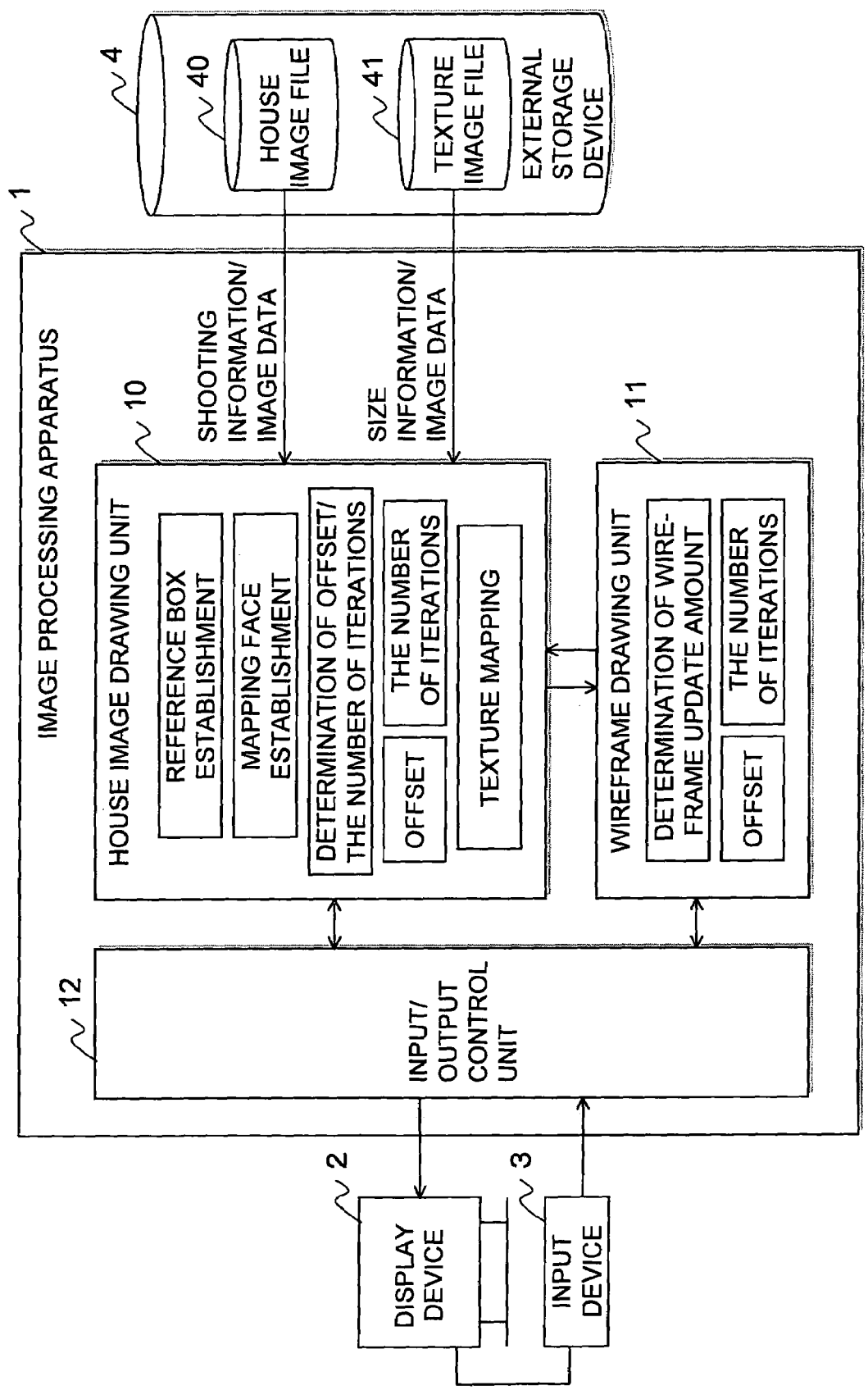
FIG. 1 shows an exemplary configuration of an image processing apparatus according to the invention.

The present invention will be described in detail with its embodiments. FIG. 1 shows an exemplary configuration of an image processing apparatus 1 according to the invention. As shown, the image processing apparatus 1 of the invention provides a display device 2, input device 3, and external storage device 4, performing image simulation processing which maps a texture to specified exterior walls of an image of a house displayed on the display device 2. To realize the simulation, the image processing apparatus 1 comprises a house image drawing unit 10 for performing processing of drawing a house image with a texture mapped to its exterior walls, a wireframe drawing unit 11 for performing processing of adjusting the position of the texture mapped to the exterior walls of the house image, and input/output control unit 12 for performing processing of controlling input or output with the display device 2 and input device 3.

House images that are drawn by the house image drawing unit 10 are stored in a house image file 40 of the external storage device 4. Images of textures to be mapped to the house images are stored in a texture image file 41 of the external storage device 4.

The house image drawing unit 10 and the wireframe drawing unit 11 realized in the image processing apparatus 1 can be implemented by computer programs. The computer programs can be provided as recorded on an appropriate recording medium such as semiconductor memory or provided over a network.

(1) Overview of processing executed by the house image drawing unit 10 and wireframe drawing unit 11

Before specifically describing the processing executed by the house image drawing unit 10 and the wireframe drawing unit 11, the processing will be generally described. The house image drawing unit 10 first defines a rectangular solid referred to as "reference box" by setting four points that constitute three axes that will be orthogonal to one another in a three-dimensional space on a house image displayed on the display device 2, and calculates the 3D coordinate values of those points. Subsequently, it uses faces of the reference box to establish an exterior wall to which a texture will be mapped, and based on the exterior wall, determines a base point (one of endpoints of the exterior wall) for drawing a texture. Then, it sets a variable "OFFSET" that is expressed as a displacement amount from the base point to the initial value 0, and also sets a variable "NUMBER_OF_ITERATIONS" that indicates the number of times drawing of the texture is repeated to an initial value that is defined by the size of the exterior wall and the size of the texture. Then, with a position that is displaced by the value of the variable "OFFSET" as the drawing start point, it draws the texture a number of times equal to the value of the variable "NUMBER_OF_ITERATIONS" so that the texture is mapped to a specified exterior wall of the house image shown on the display device 2. In this manner, the house image drawing unit 10 performs processing of drawing a house image with a texture mapped to an exterior wall.

If a texture is mapped to a plurality of exterior walls of a house image, an optimal base point for drawing is determined for each wall through the processing by the house image drawing unit 10. As a result, mismatch of a pattern can occur at a position where two exterior walls to which a texture has been mapped meet. Thus, the wireframe drawing unit 11 draws a wireframe that divides the texture according to the values of the variables "OFFSET" and "NUMBER_OF_ITERATIONS" on a house image to which the texture has been mapped. And if movement of the wireframe is directed, the wireframe is moved by updating the value of the variable "OFFSET" according to the amount of movement of a mouse that drags the wireframe. As well, when change of the number of lines of the wireframe is directed, the number of lines of the wireframe is changed by updating the value of the variable "NUMBER_OF_ITERATIONS" according to the amount of movement of the mouse that drags the wireframe. At this point, because the value of the variable "OFFSET" is changed from 0, the initial value, the wireframe drawing unit 11 executes wireframe drawing also in consideration of the area between the base point and the drawing start point.

In response to the update of the variables "OFFSET" and "NUMBER_OF_ITERATIONS" through a drag operation, during the drag operation or at the point the drag operation is complete, the house image drawing unit 10 draws the texture a number of times corresponding to the value of the variable "NUMBER_OF_ITERATIONS" with a point that is displaced by the value of "OFFSET" as the drawing start point. This re-maps the texture to a specified exterior wall of the house image displayed on the display device 2. In this process, because the value of the variable "OFFSET" is changed from 0 of the initial value, the house image drawing unit 10 re-maps the texture also in consideration of the area between the base point and the drawing start point.

As described above, the image processing apparatus 1 of the invention adopts such a constitution that draws a wireframe that divides a texture when the texture is mapped to a specified face of a 3D image displayed on the display device 2. And when the wireframe is dragged with a pointing device such as a mouse, the form in which the texture is drawn is changed according to the amount of movement of the drag operation. This allows a user to change the mapping form of a texture easily and flexibly.

(2) Details of processing executed by the house image drawing unit 10 and wireframe drawing unit 11

Figure 2:
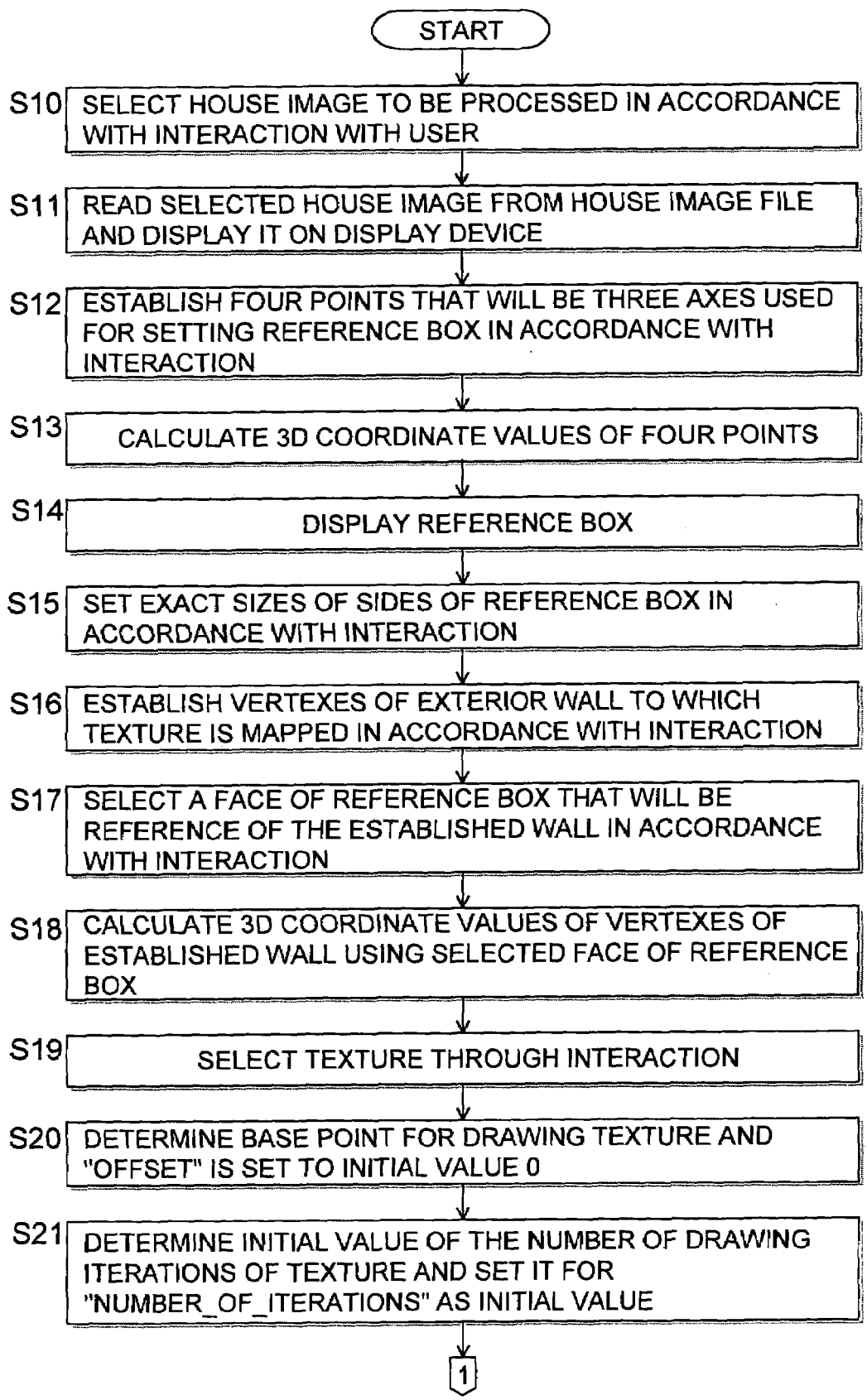
FIG. 2 shows a processing flow executed by the image processing apparatus of the invention.
Figure 3:
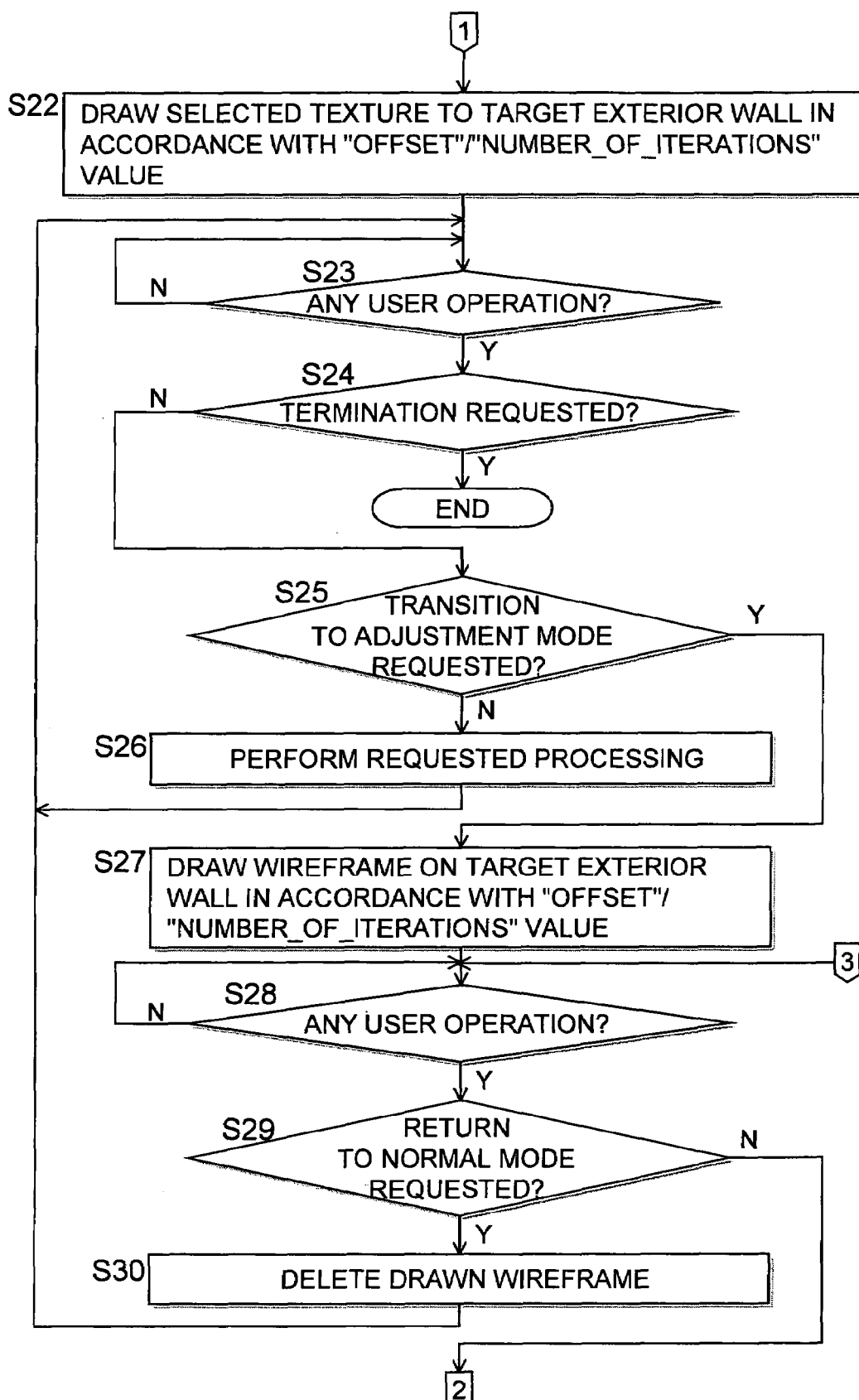
FIG. 3 shows a processing flow executed by the image processing apparatus of the invention.
Figure 4:
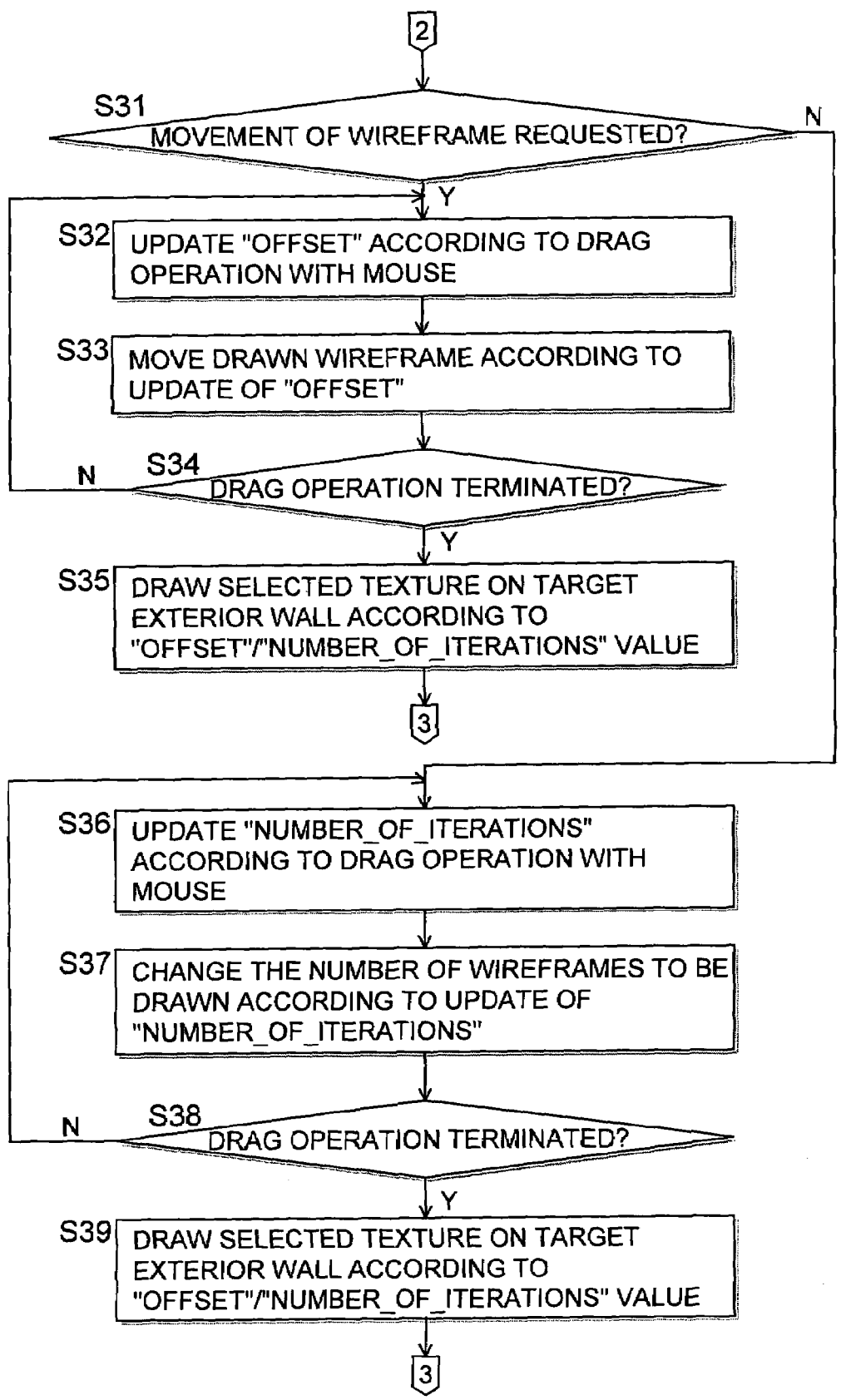
FIG. 4 shows a processing flow executed by the image processing apparatus of the invention.

FIGS. 2 to 4 show overall processing flows performed by the image processing apparatus 1 of the invention. With reference to these flows, flow of overall processing performed by the image processing apparatus 1 will be described in detail.

Figure 7:
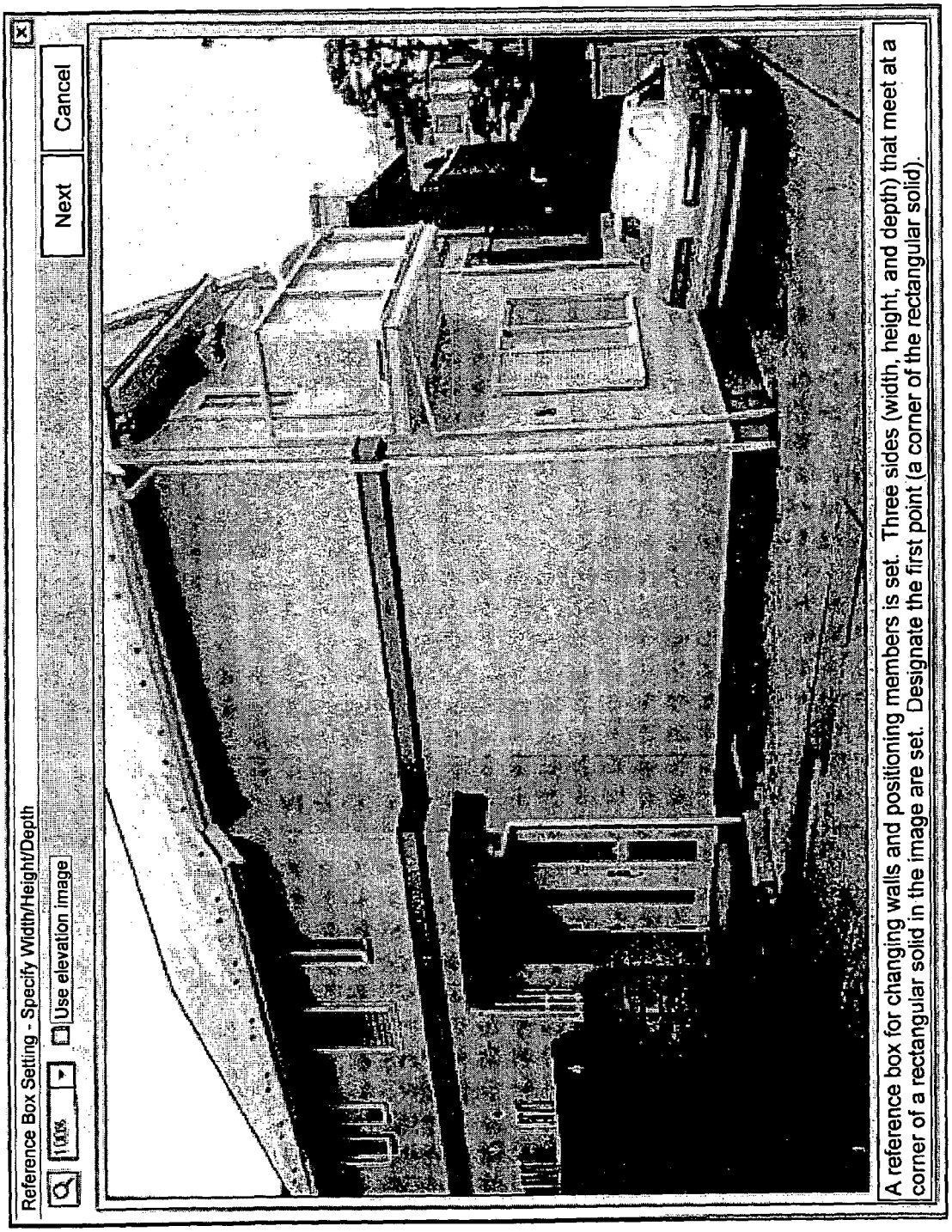
FIG. 7 shows an example of a display screen.

As shown in the flows in FIGS. 2 to 4, when a user issues a request for image simulation, the image processing apparatus 1 first selects at step 10 an image of a house to be processed according to interaction with the user, and, at step 11, reads the selected image from the house image file 40 and displays it on the display device 2. For example, as shown in FIG. 7, an image of a house to be processed that has been selected by the user is displayed on the display device 2.

Figure 8:
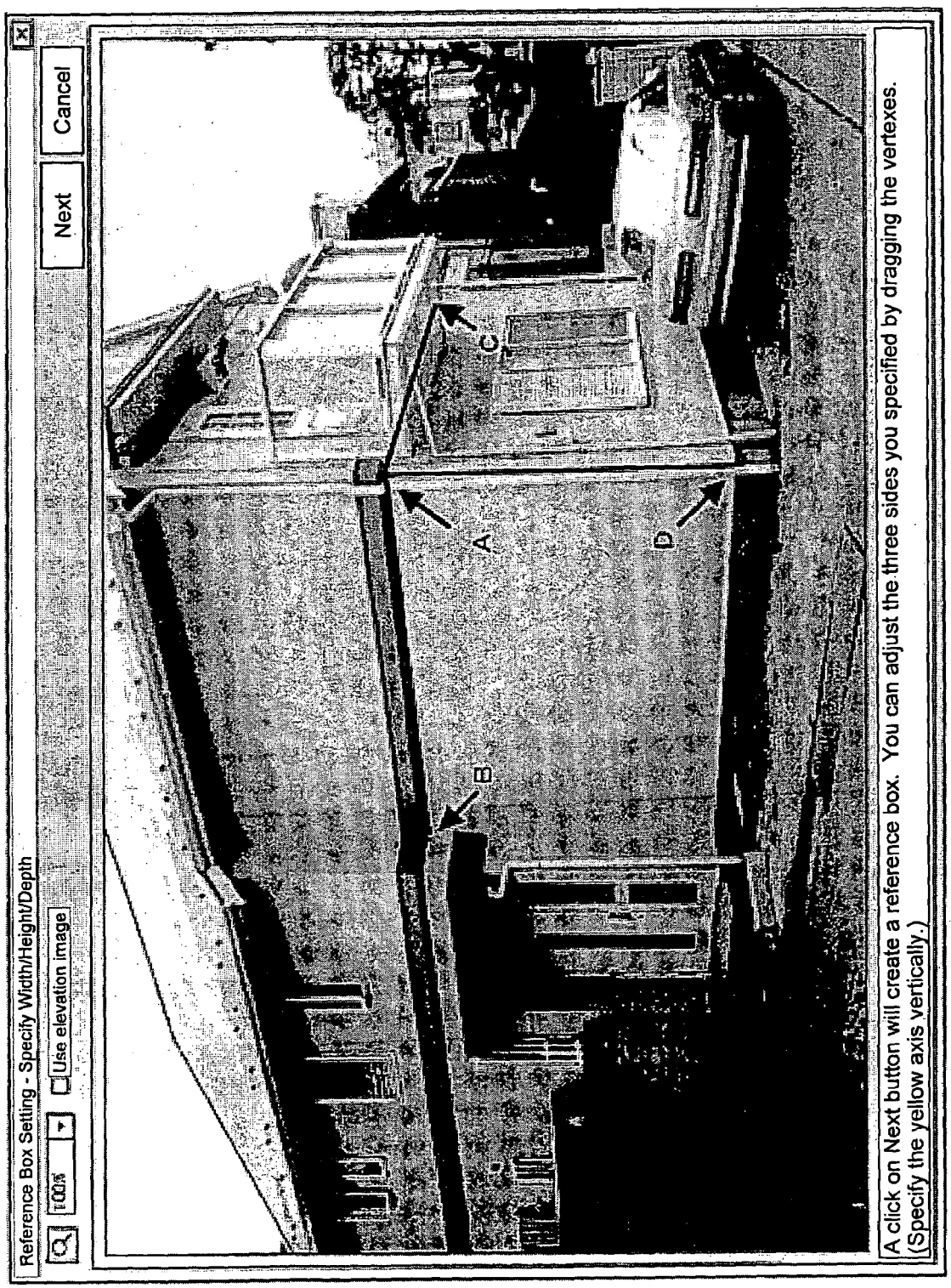
FIG. 8 shows an example of a display screen.

Then, at step 12, four points are set that will constitute three axes, which are orthogonal to one another in a 3D space, to be used for establishing a reference box on the house image on the display device 2 in accordance with interaction with the user. As an example, as shown in FIG. 8, four points A, B, C and D that will constitute three axes which are orthogonal to one another in a 3D space to be used for establishing a reference box are established on the house image on the display device 2.

Figure 9:
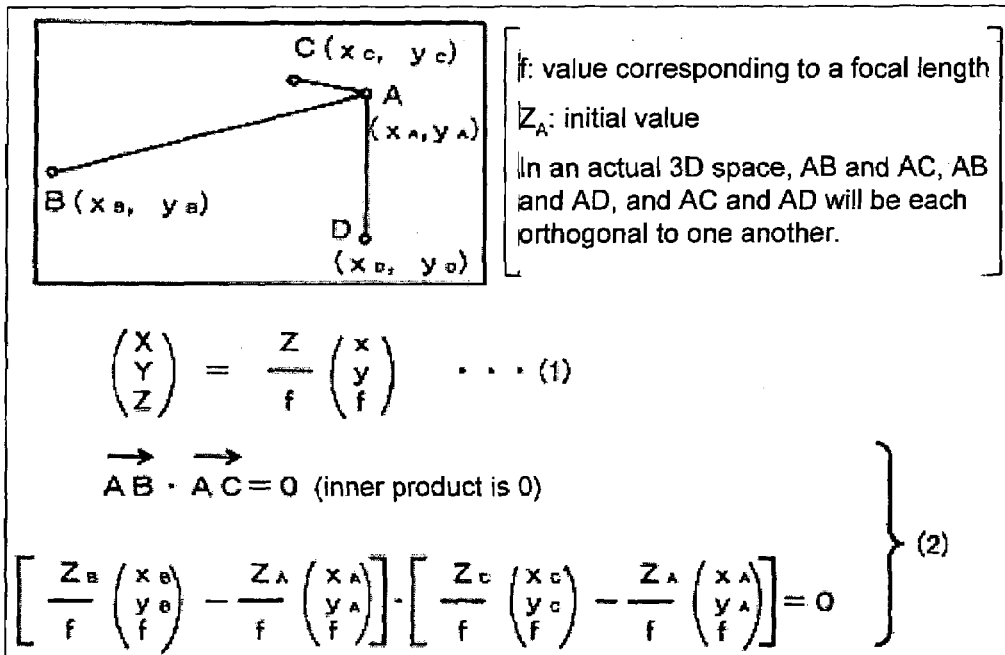
FIG. 9 illustrates formulas for use in coordinate transformation.
Figure 10:
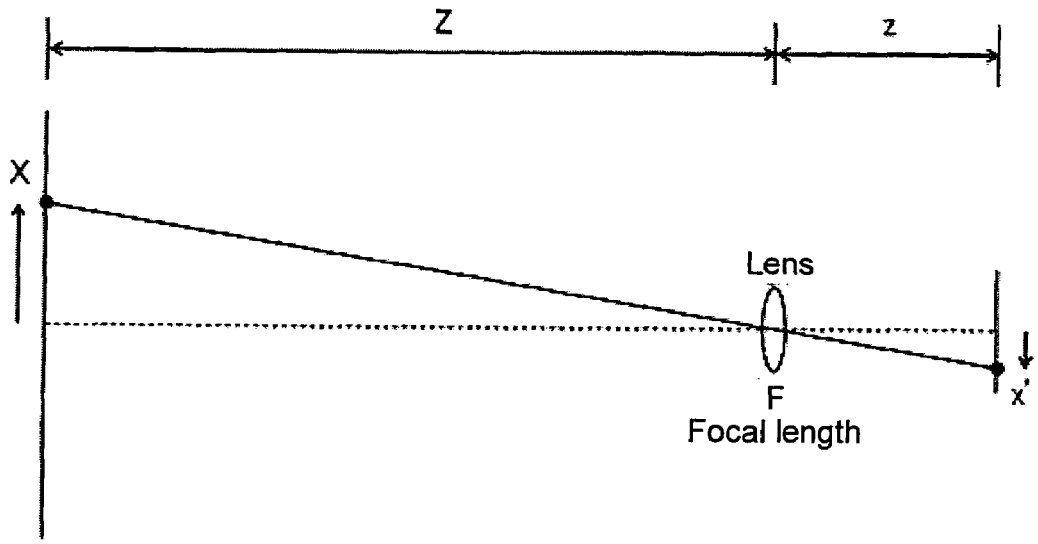
FIG. 10 illustrates formulas for use in coordinate transformation.

At step 13, the 3D coordinate values of the four points are calculated. Denoting the two-dimensional (2D) coordinate values of the four points with lower case (x,y) and the 3D coordinate values of the points with upper case (X,Y,Z), the calculation is executed with a calculation procedure shown in FIG. 9 using a formula that transforms the 2D coordinate values (x,y) of the four points specified on the screen to 3D coordinate values (X,Y,Z). Here, the Z coordinate value of an arbitrary one of the four points ($Z_A$ for point A, in this example) is determined based on image shooting information, where f is a value corresponding to a focal length defined as:

f=[the focal length of a camera×the width of an image (the number of pixels)]/the width of a film The formula (1) shown in FIG. 9 is derived with a lens formula as shown in FIG. 10.

Figure 11:
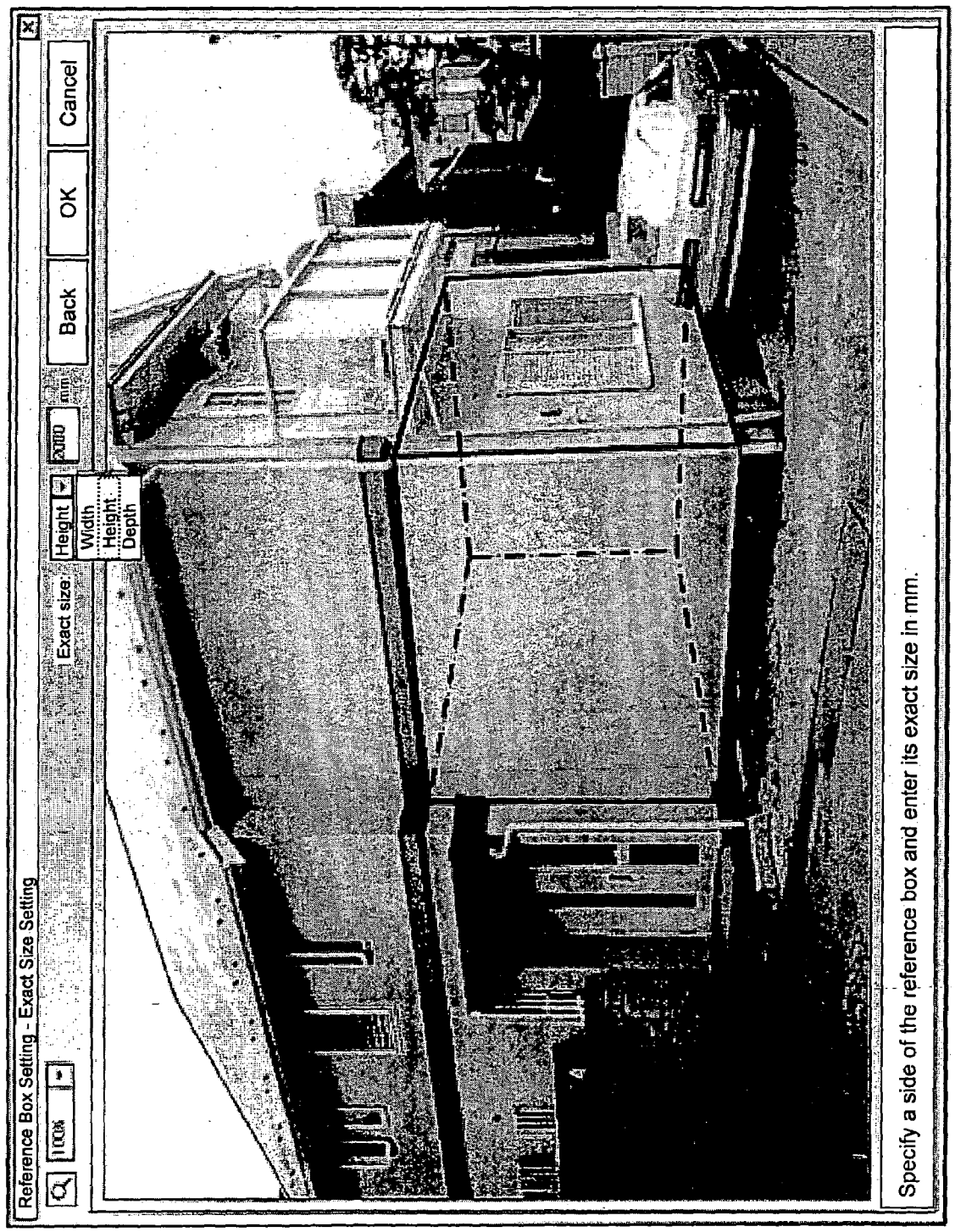
FIG. 11 shows an example of a display screen.

Then, at step S14, a reference box (a rectangular solid) that is defined by the four points set at step 12 is displayed on the house image. For example, as shown in FIG. 11, a reference box defined by the four points established at step 12 is displayed on the house image on the display device 2. The broken line in FIG. 11 indicates sides of the reference box that cannot be seen from front.

At step 15, the exact sizes of the sides constituting the reference box are determined in accordance with interaction with the user. As to this exact size, if the exact size of any one side of the box is set, that of all other sides can be determined. Thus, as shown in FIG. 11, the height of the reference box (the length AD in FIG. 8) is set to 2000 mm in accordance with interaction with the user, for example.

Figure 12:
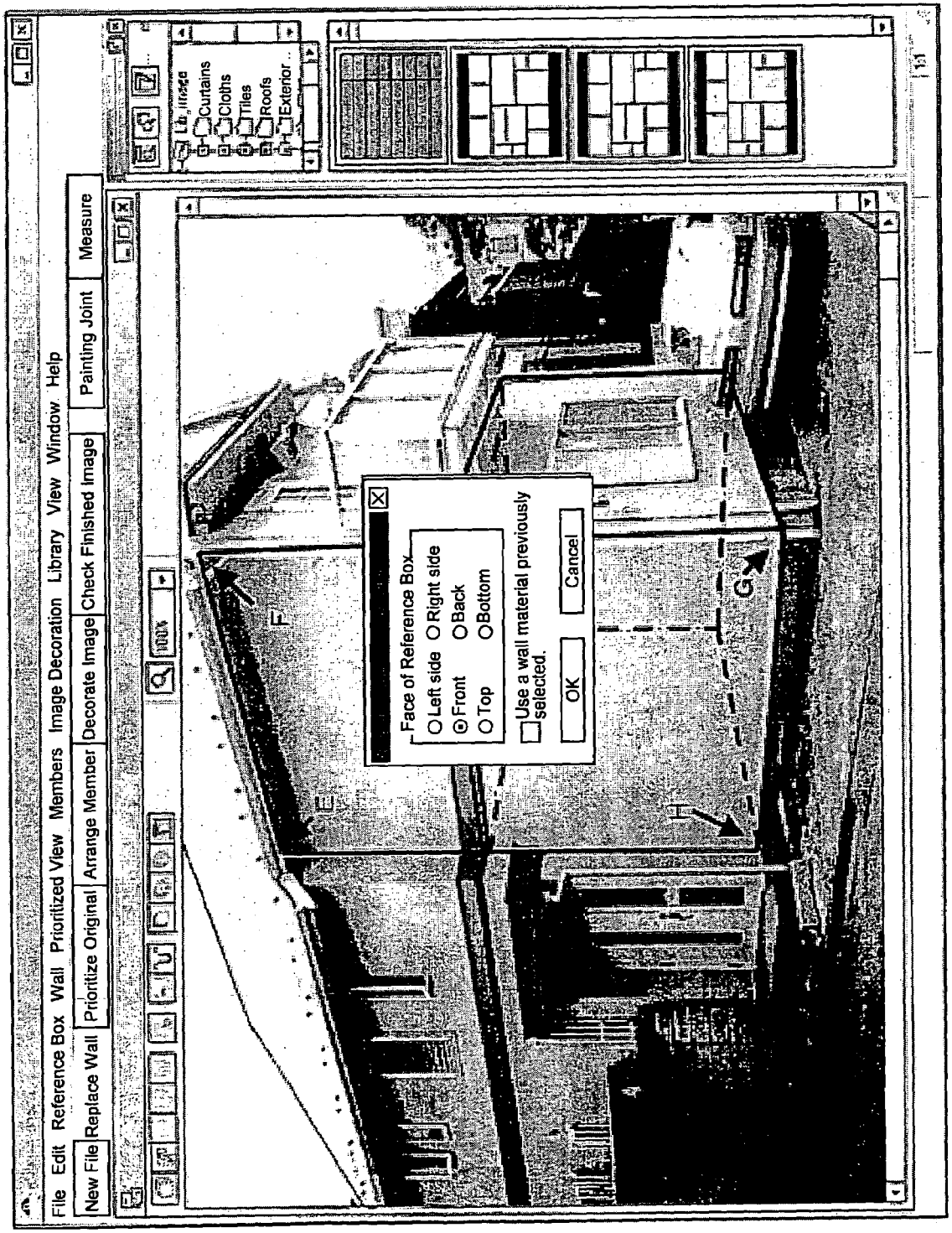
FIG. 12 shows an example of a display screen.

At step 16, the vertexes of the exterior wall to which a texture (such as tiles) will be mapped are established in accordance with interaction with the user. For example, as shown in FIG. 12, four vertexes E, F, G, and H that will be vertexes of the exterior wall to which a texture is mapped are established on the house image displayed on the display device 2. Although typically four vertexes are established, more than four vertexes may be established depending on the shape of exterior walls.

At step 17, a face of the reference box that will be the reference of the established exterior wall is selected in accordance with interaction with the user. For example, as shown in FIG. 12, this selection is performed such that the established exterior wall corresponds with the front face among the six faces of the reference box. Specifically, the purpose of the selection at step S17 is to determine with which face of the box the vertexes of the established exterior wall correspond so as to determine 3D coordinate values of those vertexes, because although values of 2D coordinates that will be the vertexes of the established exterior wall are set, 3D coordinate values for those vertexes cannot be determined. At step 18, the selected face of the reference box for which information on 3D coordinates has been obtained is used to calculate the 3D coordinate values of the vertexes of the exterior wall to which a texture will be mapped established at step 16.

At step 19, a texture to map to the exterior wall is selected in accordance with interaction with the user. For example, as shown in FIG. 12, a listing of selectable textures is displayed in a right-hand portion of the screen of the display device 2 for the user to select a texture so that a texture which will be mapped to the exterior wall is selected. The texture thus selected will be given information on its pattern as well as information on its size (vertical and horizontal lengths) as attribute information.

Then, at step 20, by searching for a side that is most parallel with any one side of the reference box face selected at step 17 from among sides that are defined by the vertexes of the exterior wall established at step 16, a baseline of the exterior wall to which the texture will be mapped is determined, and either of endpoints of the baseline is determined as the base point for drawing the texture. Further, two variables "OFFSET" that are associated with the horizontal and vertical axes and that store offset amounts from the base point are set to the initial value 0. For example, the point H in FIG. 12 is determined as the base point for drawing the texture, and two variables "OFFSET" that are associated with the horizontal and the vertical axes are set to the initial value 0.

Then, at step 21, the number of times the drawing of the texture is repeated in the direction of the baseline is determined from the length of the baseline determined at step 20 and the length of the texture in the same direction selected at step 19. As well, from the length of a side that is orthogonal to the baseline in a 3D space and one of whose endpoints is the base point and from the length of the texture in the orientation of that side, the number of times the drawing of the texture is repeated in the direction of the side is determined. Further, those numbers of repetitions thus determined are each set as the initial value for two variables "NUMBER_OF_ITERATIONS" that are associated with the horizontal axis and the vertical axis and that store the number of drawing iterations for the texture. For example, if a value of 4.23 is determined as the number of times the texture is horizontally repeated and a value of 7.91 is determined as the number of times the texture is vertically repeated, the variable "NUMBER_OF_ITERATIONS" associated with the horizontal axis is set to 4.23 and the variable "NUMBER_OF_ITERATIONS" associated with the vertical axis as initial values is set to 7.91.

Figure 13:
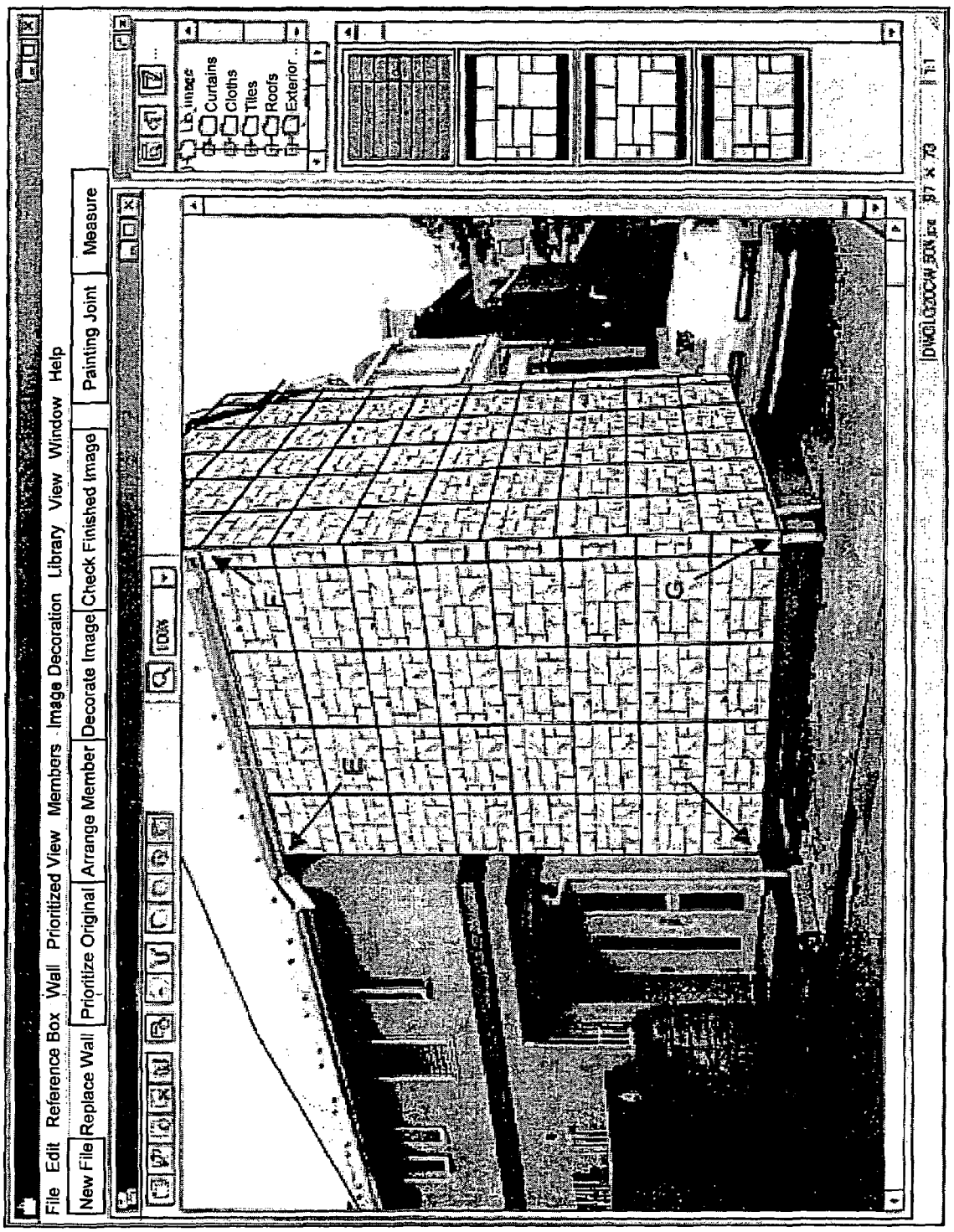
FIG. 13 shows an example of a display screen.

At step 22, by drawing the texture selected at step 19 a number of times corresponding to the value of the variable "NUMBER_OF_ITERATIONS" with a position displaced from the base point determined at step 20 by the value of the variable "OFFSET" as the drawing start point, the texture is mapped to the exterior wall established at step 16. For example, as shown in FIG. 13, the texture is mapped by drawing it the number of times equal to the value of the variable "NUMBER_OF_ITERATIONS" to the exterior wall (the face corresponding with the front face of the reference box, the point H being the base point) defined by establishing four vertexes E, F, G, and H with a point displaced by the value of the variable "OFFSET" as the start point for drawing. In order to clearly show how to map the texture, lines dividing the texture are depicted thicker than they really are in FIG. 13. The example in FIG. 13 assumes that the right face of the reference box is also set as an exterior wall to which the texture is mapped, and the texture is mapped to that exterior wall accordingly. The base point of the face for mapping the texture that corresponds with the right face of the reference box is assumed to be point G.

If some operation by the user is detected while such a house image is displayed at step 23, the process proceeds to step 24 to determine whether or not the user operation directs the termination of processing, and if it is determined the operation directs termination of processing, the processing is terminated. In contrast, if it is determined at step 24 that the user operation does not request termination of processing, the process proceeds to step 25.

Figure 14:
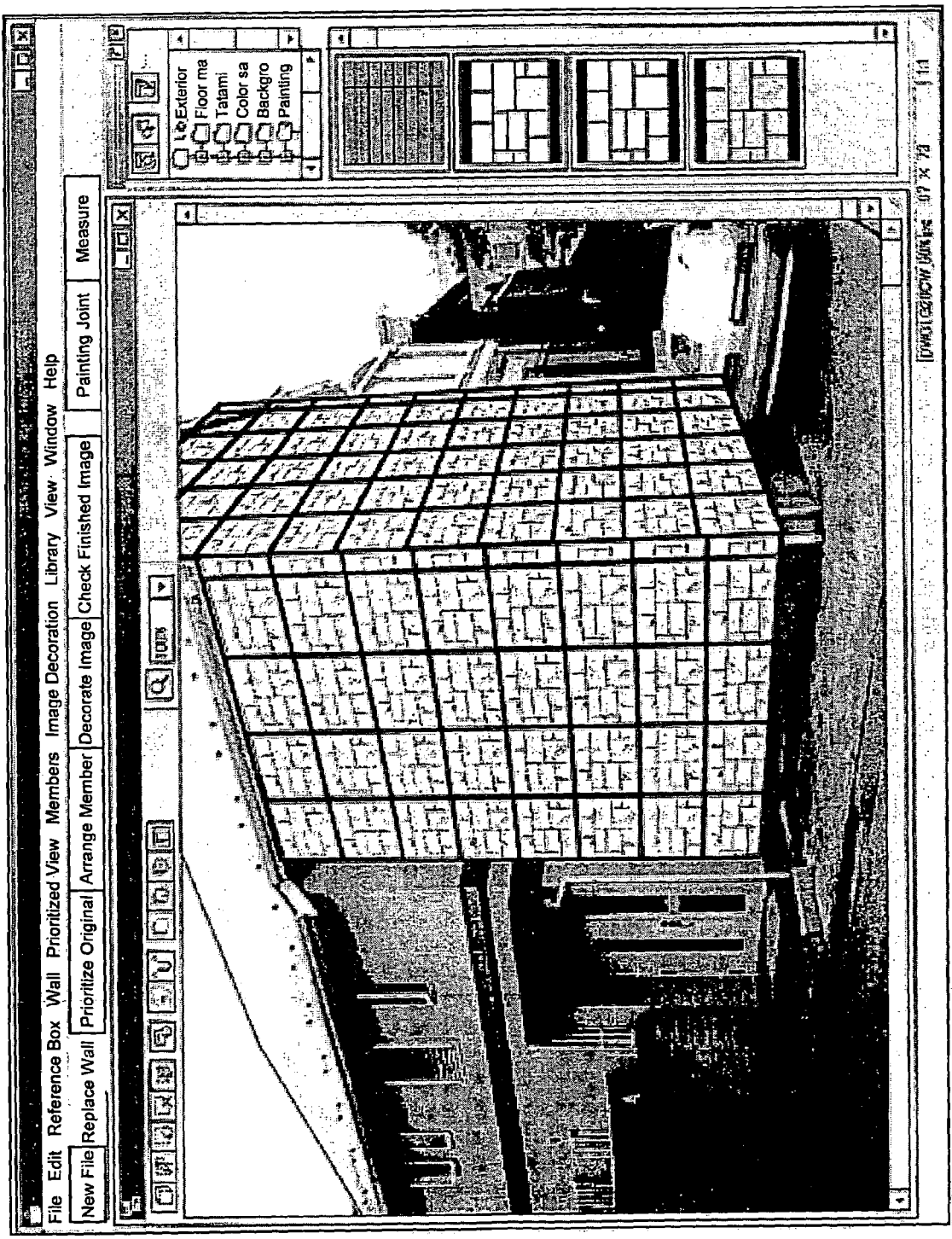
FIG. 14 shows an example of a display screen.

At step 25, it is determined whether or not the user operation requests transition to a mode of adjusting the position at which the texture is mapped, and if it is determined that the operation does not direct transition to adjusting mode, the process proceeds to step 26 to perform processing requested by the user operation and returns to step 23. Meanwhile, if it is determined at step 25 that the user operation directs transition to a mode of adjusting the mapping position of the texture, the process proceeds to step 27 to draw a wireframe that divides the texture selected at step 19 over the exterior wall established at step 16, by drawing a segment that divides the texture a number of times equal to the value of the variable "NUMBER_OF_ITERA- TIONS" with a point displaced from the base point by the value of the variable "OFFSET" as the drawing start point. That is, if transition to a mode of adjusting the mapping position of the texture is directed while the house image with the texture mapped thereon is displayed as shown in FIG. 13, a wireframe dividing the mapped texture is drawn as shown in FIG. 14.

Then, at step 28, if some operation from the user is detected while the house image with the wireframe drawn thereon is displayed, the process proceeds to step 29 to determine whether or not the user operation directs return to normal mode in which the wireframe is not displayed. If it is determined that the operation directs return to normal mode, the process proceeds to step 30 to delete the drawn wireframe and returns to step 23.

Meanwhile, if it is determined at step 29 that the user operation does not direct return to normal mode, the user operation is determined to direct either movement of the wireframe or change of the number of lines of the wire-frame, and the process proceeds to step 31 to determine whether or not the user operation directs movement of the wireframe. Based on the determination at step 31, if it is determined the user operation directs movement of the wireframe, the process proceeds to step 32 to update the value of the variable "OFFSET" in accordance with the drag operation of the mouse controlled by the user. Specifically, in the case of wireframe movement, in response to the wireframe being dragged with the mouse by the user, the amount of horizontal movement of the mouse on the screen (expressed by pixels, for example) is detected and the value of the variable "OFFSET", which is associated with the horizontal axis, is updated correspondingly. Similarly, the amount of vertical movement of the mouse on the screen (expressed by pixels, for example) is detected and the variable "OFFSET" associated with the vertical axis is updated correspondingly.

Subsequently, at step 33, in response to the update of the variable "OFFSET", the wireframe to be drawn is moved. That is, because the wireframe is drawn with a position displaced from the base point by the value of variable "OFFSET" as the drawing start point, processing is performed such that the wireframe is moved in response to the change of the variable "OFFSET" at step 32. In this way, when the user determines that a desired wireframe drawing is realized after changing the drawing form of the wireframe shown in FIG. 14, the user terminates the drag operation that directs the movement of the wireframe.

Then at step 34, it is determined whether or not the drag operation by the user has terminated, and if the drag operation has not terminated, the process returns to step 32. In contrast, if it is determined at step 34 that the user's drag operation has terminated, the process proceeds to step 35 to map the texture selected at step 19 to the exterior wall established at step 16 by drawing the texture a number of times equal to the variable "NUMBER_OF_ITERATIONS" with a point displaced from the base point by the value of the variable "OFFSET" determined at step 20 as the drawing start point. The process then returns to step 28.

Figure 15:
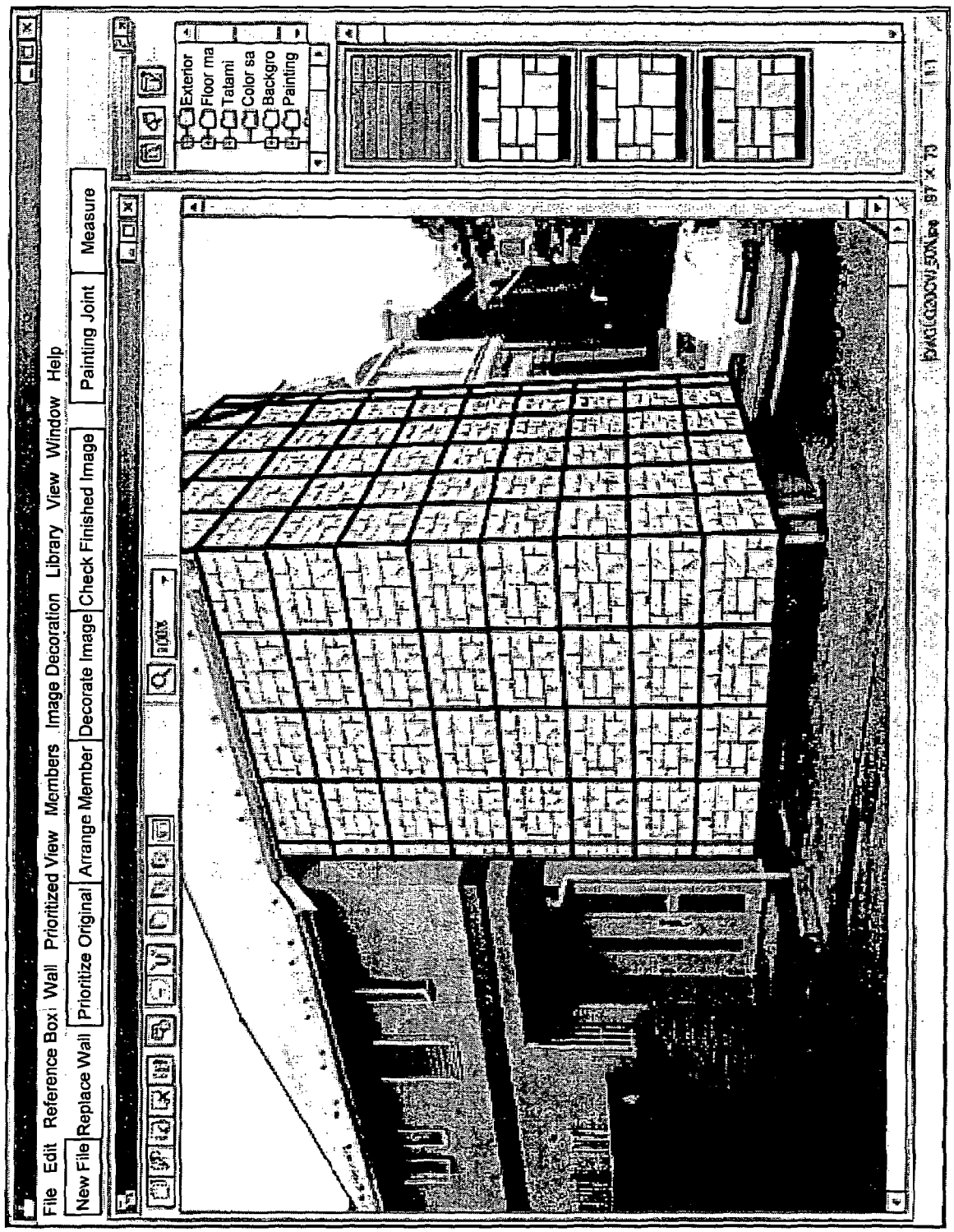
FIG. 15 shows an example of a display screen.

In such a manner, by changing the drawing form of the texture to map to the exterior wall in accordance with movement of the wireframe, mapping of the texture requested by the user can be realized in such a form shown in FIG. 15, for example. This allows the user to map a texture he/she selected in a desired form to designated exterior walls of a house image by dragging a wireframe with a mouse.

Meanwhile, if it is determined at step 31 that the user operation directs not the movement of the wireframe but change of the number of lines of the wireframe, the process proceeds to step 36 to update the value of the variable "NUMBER_OF_ITERATIONS" according to the drag operation of the mouse controlled by the user. Specifically, when changing the number of lines of the wireframe, the user drags the wireframe with a mouse pressing CTRL key, for example. In response to such a drag operation, the amount of the horizontal movement of the mouse on the screen (expressed by pixels, for example) is detected and the variable "NUMBER_OF_ITERATIONS" associated with the horizontal axis is updated correspondingly, and also the amount of the vertical movement of the mouse on the screen (expressed by pixels, for example) is detected and the variable "NUMBER_OF_ITERATIONS" associated with the vertical axis is updated correspondingly.

Then, at step 37, in response to the update of the variable "NUMBER_OF_ITERATIONS", the number of lines of the wireframe is changed. Specifically, because a drawn wireframe has as many segments as the value of the variable "NUMBER_OF_ITERATIONS", processing is performed such that the number of lines of the wireframe is changed in accordance with the change of the variable "NUMBER_OF_ITERATIONS" at step 36.

Figure 16:
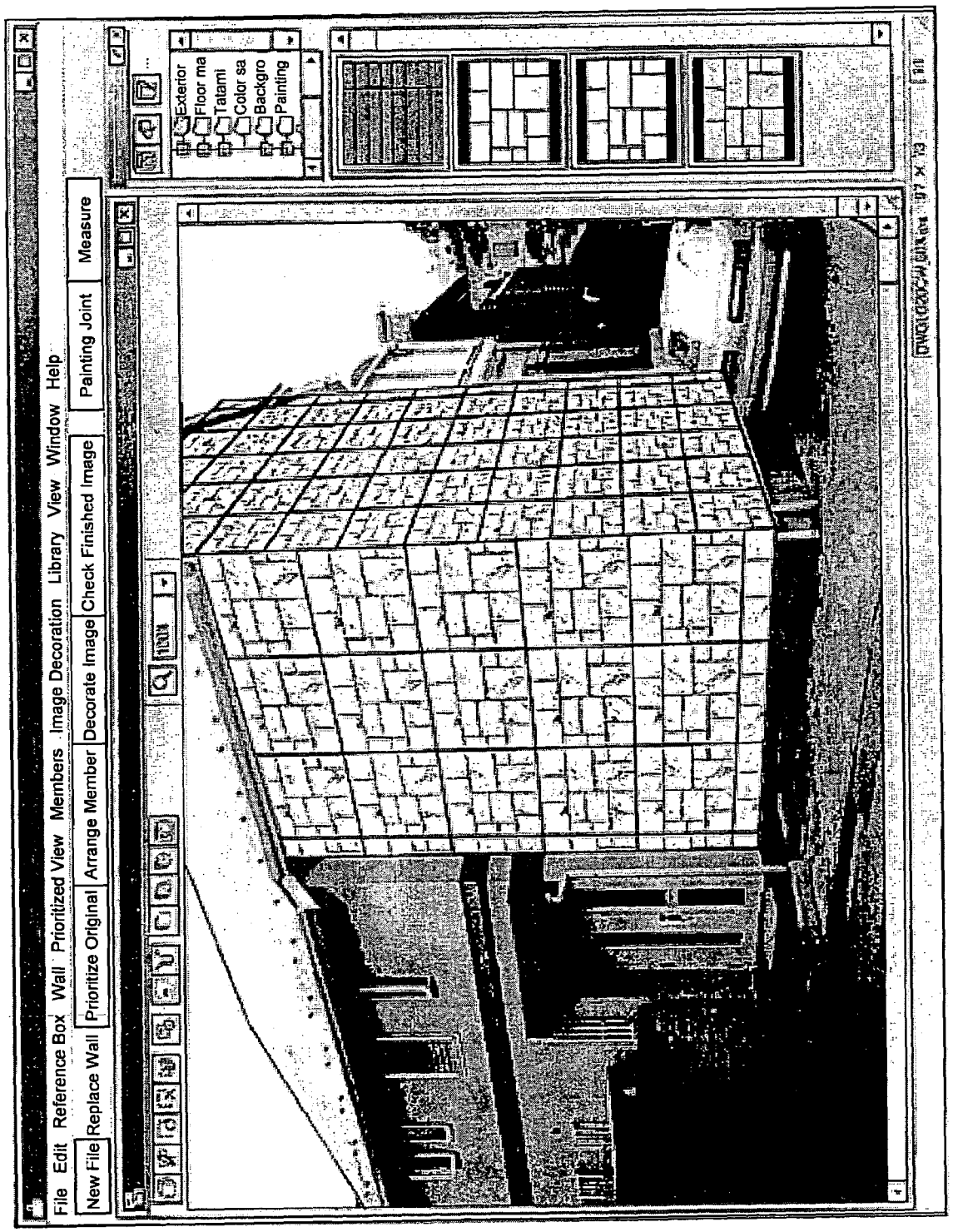
FIG. 16 shows an example of a display screen.
Figure 17:
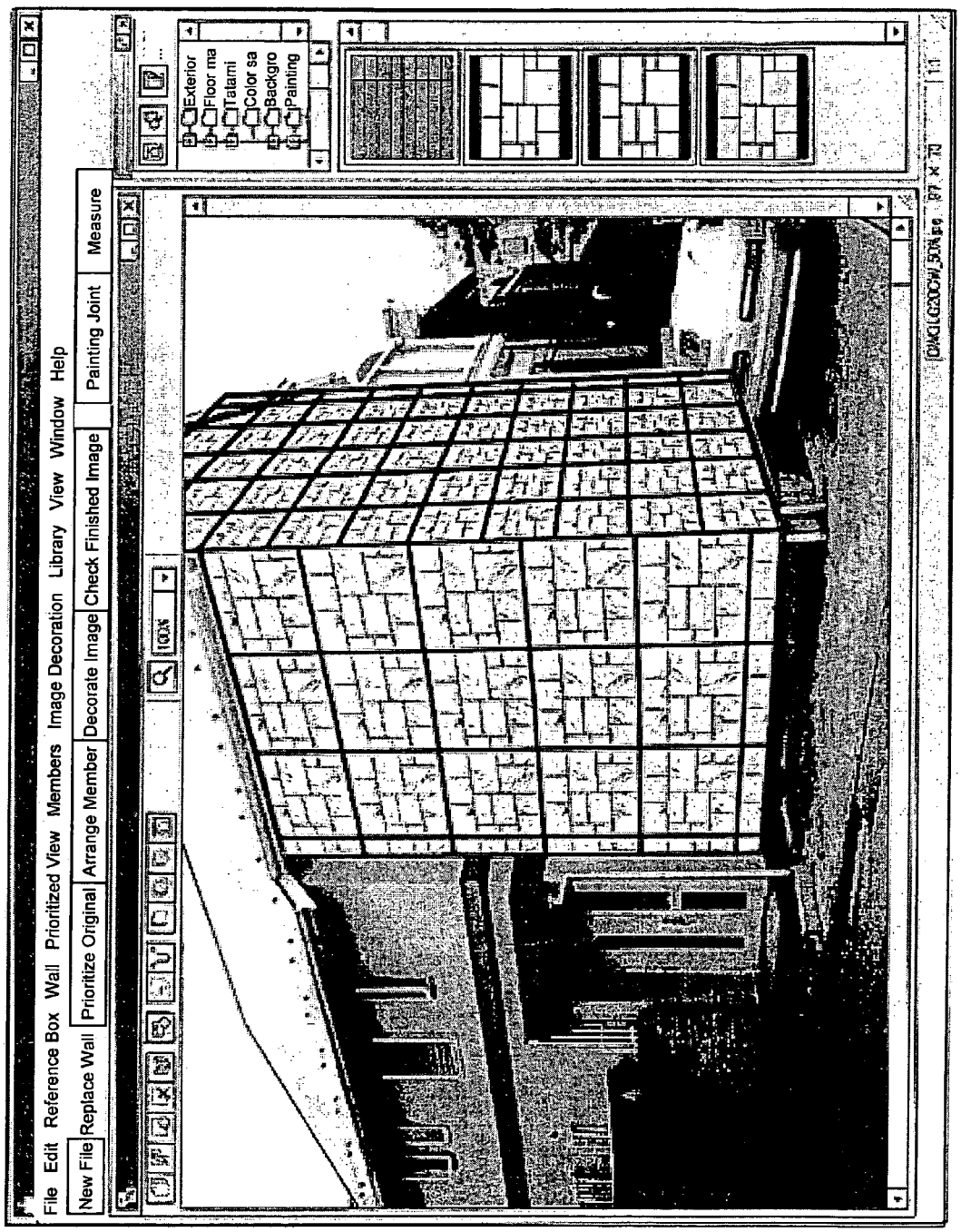
FIG. 17 shows an example of a display screen.

As described, when a wireframe such as shown in FIG. 17 has been drawn by mapping a texture in a manner as shown in FIG. 16 in accordance with the initial values of the variables "OFFSET" and "NUMBER_OF_ITERATIONS", if the user determines that a wireframe in a desired drawing form is realized after changing the drawing form of the wireframe, the user terminates the drag operation that directs the change of the number of lines of the wireframe.

Subsequently, at step 38, it is determined whether or not the drag operation by the user has terminated, and if it is determined that the drag operation has not terminated, the process returns to step 36. In contrast, if it is determined at step 38 that the user's drag operation has terminated, the process proceeds to step 39 to map the texture selected at step 19 to the exterior wall established at step 16 by drawing the texture a number of times corresponding to the variable "NUMBER_OF_ITERATIONS" with a point displaced from the base point determined at step 20 by the value of the variable "OFFSET" as the drawing start point. The process then returns to step 28.

In such a manner, by changing the drawing form of the texture mapped to the exterior wall in accordance with the change of the number of lines of the wireframe, mapping of the texture requested by the user can be realized in such a form shown in FIG. 15, for example. In this manner, the user can map a texture he/she selected in a desired form to specified exterior walls of a house image by dragging a wireframe with a mouse. Thus, the image processing apparatus 1 of the invention adopts a constitution that draws a wireframe dividing a texture when the texture is mapped to designated faces of a 3D image shown on the display device 2. And when the wireframe is dragged with a pointing device such as a mouse, the drawing form of the texture is modified according to the amount of movement of the drag operation.

Figure 5:
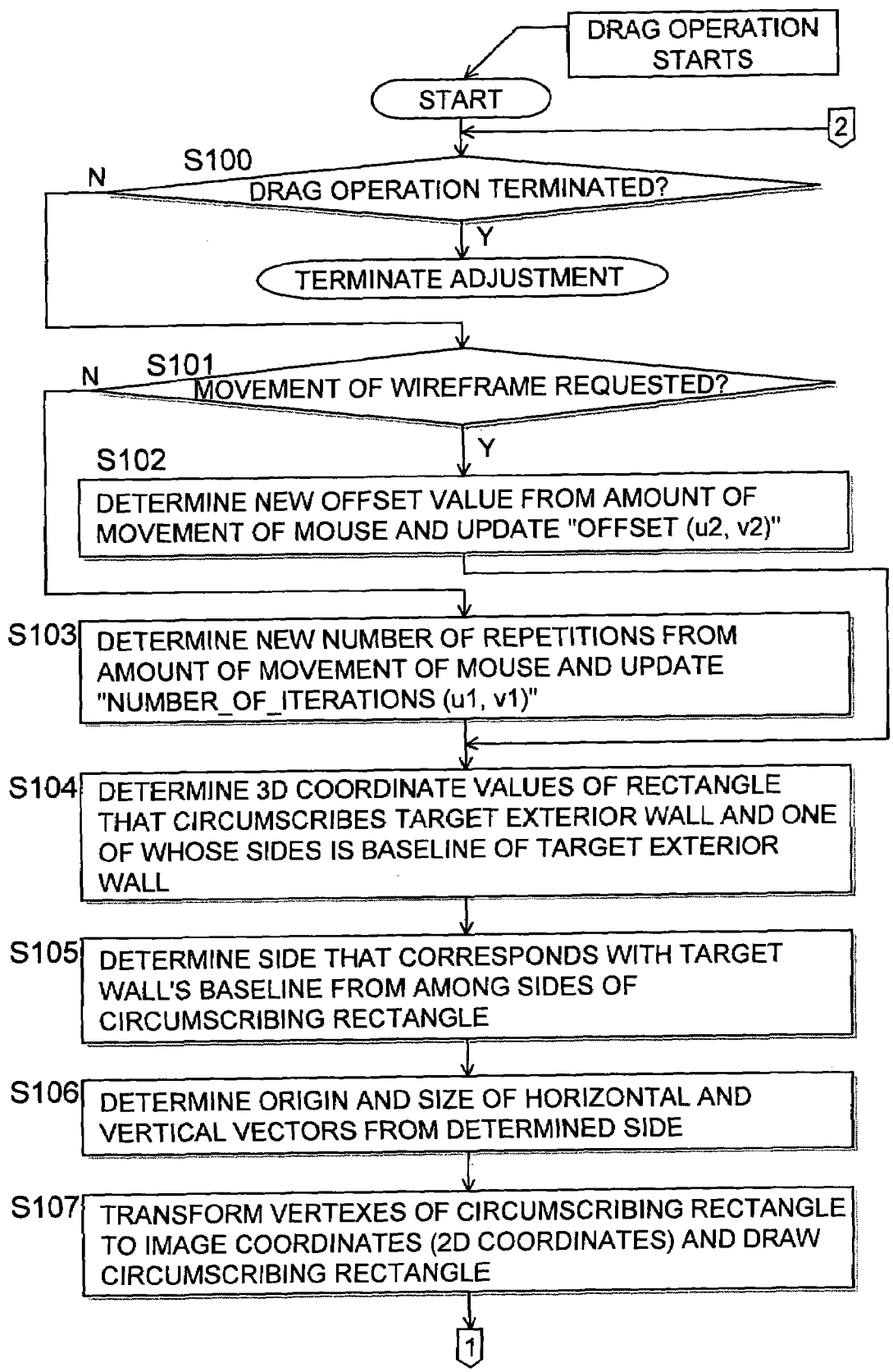
FIG. 5 shows a processing flow executed by a wireframe drawing unit.
Figure 6:
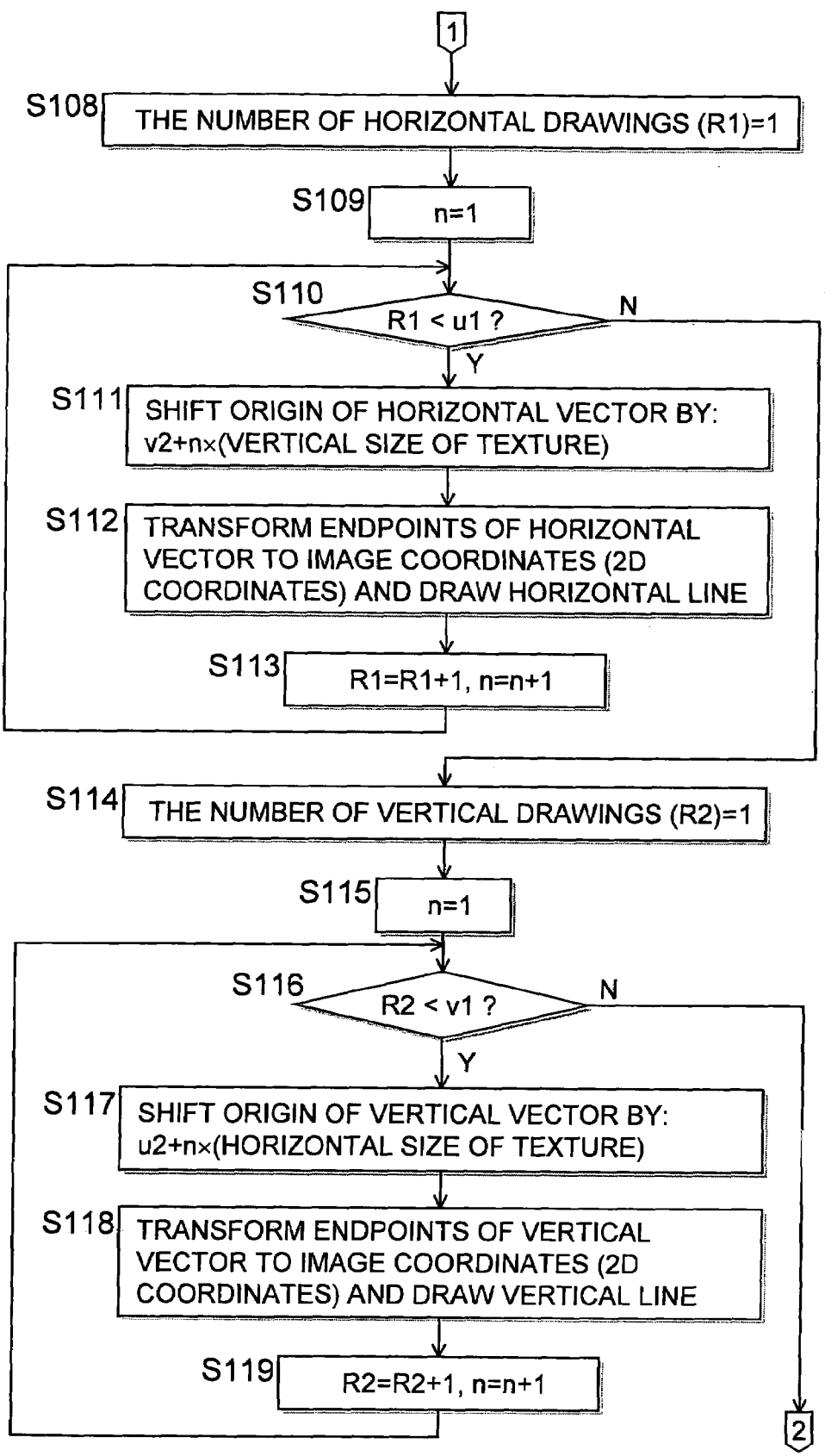
FIG. 6 shows a processing flow executed by a wireframe drawing unit.

In the following, processing performed by the wireframe drawing unit 11 (processing at steps 31 to 38 described above) will be described in detail with the processing flows shown in FIGS. 5 and 6.

When control is passed to it from the house image drawing unit 10 in response to the user directing transition to a mode of adjusting the mapping position of the texture, the wireframe drawing unit 11 draws a wireframe dividing the texture over the house image, as described with step 27. If the wireframe is dragged with a mouse operation by the user while the wireframe dividing the texture is displayed, it is first determined at step 100 whether the drag operation has terminated or not, as shown in the flows in FIGS. 5 and 6. And if it is determined that the drag operation has terminated, it is determined that adjustment of mapping position of the texture is complete, and control is returned to the house image drawing unit 10 and the processing terminates.

Meanwhile, if it is determined at step 100 that the drag operation has not terminated, the process proceeds to step 101 to determine whether or not the drag operation has been performed with CTRL key pressed so as to determine whether the operation directs either movement of the wireframe or change of the number of lines of the wireframe. If the determination at step 101 determines the operation has been done without pressing CTRL key and thus movement of the wireframe is directed, the process proceeds to step 102 to determine a new offset value from the amount of the mouse movement and update a variable "OFFSET (u2, v2)".

In contrast, if the determination at step 101 determines that the drag operation has been done with CTRL key pressed and thus change of the number of lines of the wireframe is directed, the process proceeds to step 103 to determine a new number of repetitions from the amount of the mouse movement and update a variable "NUMBER_OF_ITERATIONS (u1, v1)".

Then, at step 104, the 3D coordinate values of a rectangle that circumscribes the exterior wall to which the texture is mapped and one of whose sides is the baseline of that exterior wall (the baseline determined at step 20 described above) are determined. In this embodiment, the texture is mapped to a rectangle that circumscribes the exterior wall (which may not be a rectangle) specified as a target for texture mapping in order to simplify the processing, so that the 3D coordinate values of a circumscribing rectangle one of whose sides is the baseline are determined here.

At step 105, a side is identified among the sides of the circumscribing rectangle that corresponds with the baseline of the exterior wall to which the texture will be mapped, and at step 106, the origins of the horizontal and vertical vectors and the sizes of those vectors are determined from the side. Then, at step 107, each vertex of the circumscribing rectangle is transformed to image coordinates (2D coordinates) and the rectangle is drawn based on the vertexes.

In this manner, an outline of a rectangle circumscribing the exterior wall to which the texture is mapped is drawn on the house image displayed on the display device 2 to which the texture has been mapped through the processing at steps 104 to 107.

In accordance with the formula (1) in FIG. 9, the conversion of 3D coordinate values to image coordinates is performed with formulas:

$$2D \text{ coordinate } x = (f * 3D \text{ coordinate } X)/3D \text{ coordinate } Z;$$

$$2D \text{ coordinate } y = (f * 3D \text{ coordinate } Y)/3D \text{ coordinate } Z,$$

(where f is a value corresponding to a focal length.)

Although omitted in the formulas, in fact, information on a position in the image that is in focus (the center position of the image, for example) is added to the right side. In addition, global coordinate system will be used for 3D coordinates X, Y, and Z.

Subsequently, at step 108, a variable R1 that indicates the number of times a horizontal line constituting a wireframe is drawn is set to 1, the initial value, and at step 109, a variable n is set to the initial value 1. Then, at step 110, it is determined whether or not the value of R1 exceeds the value u1 of "NUMBER_OF_ITERATIONS (u1, v1)", and if the value R1 does not exceeds u1, the process proceeds to step 111 to shift the origin for the horizontal vector by $$v2 \rightarrow v2 + n \times (\text{the vertical size of the texture})$$

At step 112, the endpoints of the horizontal vector thus shifted are converted to image coordinates (2D coordinates) and, based on the coordinates, a horizontal line is drawn as shifted accordingly. Then, at step 113, the variable R1 is incremented by one and the variable n is also incremented by one before returning to step 110.

In this manner, by repeating the processing at steps 110 to 113, horizontal segments are drawn that correspond to the vertical size of the texture inside the outline of the circumscribing rectangle that has been drawn through the processing at steps 104 to 107.

In drawing the horizontal segments, if it is determined at step 110 that the value of R1 exceeds the value u1 of "NUMBER_OF_ITERATIONS (u1, v1)" and thus the drawing of the horizontal segments is complete, the process proceeds to step 114 to set the variable R2, which indicates the number of times a horizontal line constituting the wireframe is drawn, to the initial value 1, and at step 115, the variable n is set to the initial value 1.

Then, at step 116, it is determined whether or not the value of R2 exceeds the value v1 of "NUMBER_OF_ITERATIONS (u1, v1)", and if R2 does not exceeds v1, the process proceeds to step 117 to shift the vector origin for horizontal direction by $$u2 \rightarrow u2 + n \times \text{(the horizontal size of the texture)}$$

At step 118, the endpoints of the vertical vector thus shifted are converted to image coordinates (2D coordinates) and, based on the coordinates, the vertical line is drawn as shifted. Then, at step 119, the variable R2 is incremented by one and the variable n is also incremented by one before returning to step 116.

In this manner, by repeating the processing at steps 110 to 113, vertical segments corresponding to the horizontal size of the texture are drawn inside the outline of the circumscribing rectangle that has been drawn through the processing at steps 116 to 119. In drawing the vertical segments, if it is determined at step 116 that the value of R2 exceeds the value v1 of "NUMBER_OF_ITERATIONS (u1, v1)" and thus the drawing of the vertical segments is complete, it is determined that the drawing of the wireframe such as shown in FIG. 14 is complete, and the process returns to step 110.

As has been described, if movement of the wireframe or change of the number of lines of the wireframe is directed with a drag operation of the mouse when the wireframe that divides the texture is drawn, the wireframe drawing unit 11 modifies the drawing form of the texture in accordance with the amount of movement of the dragging.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein. Further, This application claims priority from Japanese patent application Serial Number 2002-334621 filed Nov. 19, 2002, the contents of which are incorporated by reference herein.

What is claimed is:

1. An image simulation method for mapping a texture to a specified face of a three-dimensional image shown on a display, comprising;

setting three axes that will be orthogonal to one another using a plurality of points of the three dimensional image in order to establish a three dimensional space on the three-dimensional image;

establishing a target face, to which a texture will be mapped, on the basis of a virtual surface which is set with the three axes of the three-dimensional space;

determining initial values of a drawing start point for drawing the texture and number of drawing iterations on the basis of the length of the side of the virtual surface and the size of the texture so that the target face is fully mapped with the texture;

drawing the target face with the texture mapped thereto on the display in accordance with the drawing start point and the number of drawing iterations; and drawing a wireframe, which divides the target face mapped with the texture, on the display in accordance with the drawing start point and the number of drawing iterations.

2. The image simulation method according to claim 1, wherein in a case a change of the number of lines of the wire frame is requested by dragging the wire frame on the display, the value of the number of drawing iterations is changed in accordance with the number of the wireframes changed on the basis of the amount of movement of the dragging the wireframe.

3. An image simulation method for mapping a texture to a specified face of a three-dimensional image shown on a display, comprising:

setting three axes that will be orthogonal to one another using a plurality of points of the three dimensional image in order to establish a three dimensional space on the three-dimensional image;

establishing a target face, to which a texture will be mapped, on the basis of a virtual surface which is set with the three axes of the three-dimensional space;

determining initial values of a drawing start point for drawing the texture and number of drawing iterations on the basis of the length of the side of the virtual surface and the size of the texture so that the target face is fully mapped with the texture;

drawing the target face with the texture mapped thereto on the display in accordance with the drawing start point and the number of drawing iterations; and drawing a wireframe which divides the target face mapped with the texture on the display in accordance with the drawing start point and the number of drawing iterations, wherein in a case a movement of the wireframe is requested by dragging the wireframe on the display, the value of the drawing start point is changed in accordance with the amount of movement of the dragging the wireframe.

4. An image simulation method for mapping a texture to a specified face of a three-dimensional image shown on a display, comprising:

setting three axes that will be orthogonal to one another using a plurality of points of the three dimensional image in order to establish a three dimensional space on the three-dimensional image;

establishing a target face, to which a texture will be mapped, on the basis of a virtual surface which is set with the three axes of the three-dimensional space;

determining initial values of a drawing start point for drawing the texture and number of drawing iterations on the basis of the length of the side of the virtual surface and the size of the texture so that the target face is fully mapped with the texture;

drawing the target face with the texture mapped thereto on the display in accordance with the drawing start point and the number of drawing iterations;

drawing a wireframe, which divides the target face mapped with the texture, on the display in accordance with the drawing start point and the number of drawing iterations, wherein in a case of movement of the wireframe and a change of the number of wireframes is requested by drawing the wireframe on the display, a value of the drawing start point is changed in accordance with the amount of movement of the drawing the wireframe and the value of the number of drawing iterations is chanced in accordance with the number of the wireframes changed on the basis of the amount of movement of the drawing the wireframe.

* * * * *

UNITED STATES PATENT AND TRADEMARK OFFICE
CERTIFICATE OF CORRECTION

PATENT NO.       : 7,064,767 B2                                            Page 1 of 1
APPLICATION NO.  : 10/715822
DATED            : June 20, 2006
INVENTOR(S)      : Kazuyuki Matsumoto et al.

It is certified that error appears in the above-identified patent and that said Letters Patent is hereby corrected as shown below:

Title Page, Item

(54) Title, change "SOLUTION" to --SIMULATION--

Col. 1, line 1, change "SOLUTION" to --SIMULATION--

Col. 11, line 45, change "comprising;" to --comprising:--

Col. 12, line 55, change "drawing" to --dragging--

Col. 12, line 57, change "drawing" to --dragging--

Col. 12, line 59, change "chanced" to --changed--

Col. 12, line 61, change "drawing" to --dragging--

Signed and Sealed this

Third Day of April, 2007

JON W. DUDAS
*Director of the United States Patent and Trademark Office*